United States Patent
Kult et al.

(10) Patent No.: US 6,480,597 B1
(45) Date of Patent: *Nov. 12, 2002

(54) SWITCH CONTROLLER FOR A TELECOMMUNICATIONS NETWORK

(75) Inventors: George Kult, Fairfield; Sharadha Vijay, Cedar Rapids, both of IA (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,938

(22) Filed: Jun. 12, 1998

(51) Int. Cl.[7] ............................................... H04M 5/00
(52) U.S. Cl. .................. 379/242; 379/221.08; 379/243; 379/244
(58) Field of Search ................................ 379/201, 207, 379/210, 242, 244, 211, 221.08, 221.11, 201.03, 221.09, 231.05

(56) References Cited

U.S. PATENT DOCUMENTS

| 4,928,304 | A | * | 5/1990 | Sakai | ........................ 379/93.14 |
| 5,541,917 | A | * | 7/1996 | Farris | ........................ 370/352 |
| 5,544,163 | A | | 8/1996 | Madonna | |
| 5,673,299 | A | * | 9/1997 | Fuller et al. | ................. 379/201 |
| 5,706,437 | A | | 1/1998 | Kirchner et al. | |
| 5,790,173 | A | * | 8/1998 | Strauss et al. | ............... 725/114 |
| 5,825,857 | A | | 10/1998 | Reto et al. | |
| 5,826,030 | A | | 10/1998 | Herbert | |
| 5,912,961 | A | | 6/1999 | Taylor et al. | |
| 5,920,621 | A | | 7/1999 | Gottlieb | |
| 5,937,042 | A | | 8/1999 | Sofman | |
| 6,058,181 | A | * | 5/2000 | Hebert | ........................ 379/242 |
| 6,108,337 | A | | 8/2000 | Sherman et al. | |
| 6,188,761 | B1 | | 2/2001 | Dickerman et al. | |

OTHER PUBLICATIONS

Sammon et al, Personal web–based teleconferencing method and system, Aug. 23, 2001.*

* cited by examiner

Primary Examiner—Armad F. Matar
Assistant Examiner—Bing Bui

(57) ABSTRACT

The present invention is a switch controller that provides an interface between a public switched telephone network and intelligent services network components. The switch controller controls the operation of one or more programmable switches that accept calls from the public switched telephone network. Intelligent service network components are used for enhanced service processing, interconnection to external networks, and other call functions. The switch controller includes a switch controller application program. Within the switch controller application program are multiple routines that perform call processing. The design of the switch controller application program hides vendor-specific processing and service-specific processing from routines not needing the vendor-specific and service-specific details.

12 Claims, 9 Drawing Sheets

SWITCH CONTROLLER FOR A TELECOMMUNICATIONS NETWORK

TECHNICAL FIELD OF THE INVENTION

The present invention relates generally to providing an interface between components within a telecommunications network.

BACKGROUND OF THE INVENTION

Telecommunications service providers desire to offer enhanced services to customers. However, current technology is expensive and available only to handle large call volumes. As a result, some telecommunications service providers cannot offer enhanced services. Even if a telecommunications service provider can offer enhanced services to a calling area, the telecommunications service provider must charge rates substantially higher than other services in order to compensate for the cost of equipment.

Enhanced services are telecommunications network products that offer features that differ from traditional dial-1 service. Telecommunications network products are services provided by telephone companies that are carried on telecommunications networks. A widely known telecommunications network product is dial-1 long distance voice service which allows a customer to dial a 1 plus a ten digit number from his or her home telephone, talk to a party who answers the telephone on the line of the ten digit number dialed, and pay for the telephone call when billed at the end of the month.

Although dial-1 is popular, other services, referred to as enhanced services, are sometimes preferable. Some enhanced services allow customer calling and payment options that differ from traditional dial-1 service. For example, debit calling allows an individual to make a call from a phone other than their home phone and charge the call to the debit account. With debit calling, also referred to as prepaid calling, a customer puts funds in an account and has those funds debited each time a telephone call is made. Another calling and payment option is collect calling in which the call is billed to the receiving party's account. However, enhanced services are not limited to other calling and payment options. Enhanced services can provide a customer with information such as access to news and weather. Another enhanced service is 1-800-MUSICNOW which gives a telephone caller the ability to select and listen to music and then order a recording of the music by entering selections in response to menu prompts using the keypad of the telephone.

Enhanced services are possible because intelligent services networks (ISNs) within telephone companies telecommunications networks have advanced capabilities needed to process the enhanced service calls. Much of the advanced capability is provided by two particular components within the intelligent service network, the automatic call distributor (ACD) which provides the call switching and queuing functions and the intelligent service network applications processor (ISNAP) which provides monitoring and control of queued calls for the ISN.

Unfortunately, ACDs are typically only available with capacity to handle a large call volume. In addition, ACDs are generally very expensive. Because the ACD is generally expensive, the ACD typically determines the size and capacity of an ISN. Many smaller sized telecommunications carriers and private entities desire to employ ISN capability, but do not have sufficient call volumes to justify the expense of a traditional large-scale ACD. The ISN architectures that are available today cannot be scaled to the appropriate port capacity for small or moderate call volumes. This prohibits both small and large companies from utilizing ISNs where they are commonly needed. Although smaller switches are available, they are not capable of performing many ACD functions needed for enhanced services.

Another problem encountered with a large-scale ACD-based ISN is the development cost and cycle of ACDs. Often the deployment of new services for the ISN or enhancement to existing services on the ISN require modifications to the ACD. The ISN service provider must subject itself to the ACD vendor's development costs and time.

SUMMARY OF THE INVENTION

The present invention is an intelligent services network (ISN) that uses a switch controller. The switch controller controls the operation of one or more programmable switches which provide switching functionality between the telecommunications network and components on the ISN. The programmable switches perform the switching functionality traditionally performed by automated call distributors (ACDs) at a lower cost and allow for more flexibility in sizing for smaller call volumes. In addition, the switch controller provides an interface to other components on the ISN that provide interface with callers and other networks to provide enhanced service functionality and access to data and services of other networks. The switch controller performs many functions for the interface to other components on the ISN traditionally performed by (ACDs) including call routing and call queuing. However, unlike ACDs, service logic programs within the switch controller provide these functions. Service logic programs provide greater efficiency and allow the switch controller to be easily upgraded to handle new enhanced services. The switch controller also performs the functions traditionally performed by the intelligent service network applications processor (ISNAP) including monitoring and control of queued calls. In addition, the switch controller performs other functions needed for enhanced service call processing, such as functions needed for prepaid call processing.

Use of switch controllers and programmable switches in place of ACDs allows an ISN to be scaled to an appropriate port capacity for the entity desiring to provide enhanced telecommunications services. To scale an ISN to a needed port capacity, programmable switch ports can be added or removed without having to modify the switch controller or add more switch controllers. In addition, switching functions for remote programmable switches can be controlled by the switch controller. This allows a programmable switch at one ISN to be connected to a programmable switch at another ISN. Interconnection between programmable switches enables one ISN to automatically backup another ISN. An ISN can receive calls from another ISN without call transfer over the public switched telephone network.

A scalable ISN architecture allows small service providers to deploy an ISN that suits their needs. It also allows any service provider to deploy ISNs in a greater number of locations, such as in foreign countries, where a large-scale ISN may not be economically practical. Also, as the volume of traffic handled by an ISN grows, additional programmable switches may be added at marginal expense. To expand the capacity of an ACD-based ISN, a second ACD would be needed which is extremely expensive and often prohibitive. Even if a high call volume ISN is desired, an ISN with a switch controller and programmable switches can be implemented with the same capacity as an ISN with an ACD at a significantly lower cost.

An additional benefit of implementing an ISN using a switch controller and programmable switches is that because the switch controller uses service logic programs to provide enhanced services, the switch controller can be easily upgraded to handle new enhanced services. As a result, development time and costs are reduced.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

DETAILED DESCRIPTION OF THE PREFERRED EMBODIMENTS

Figure 1:
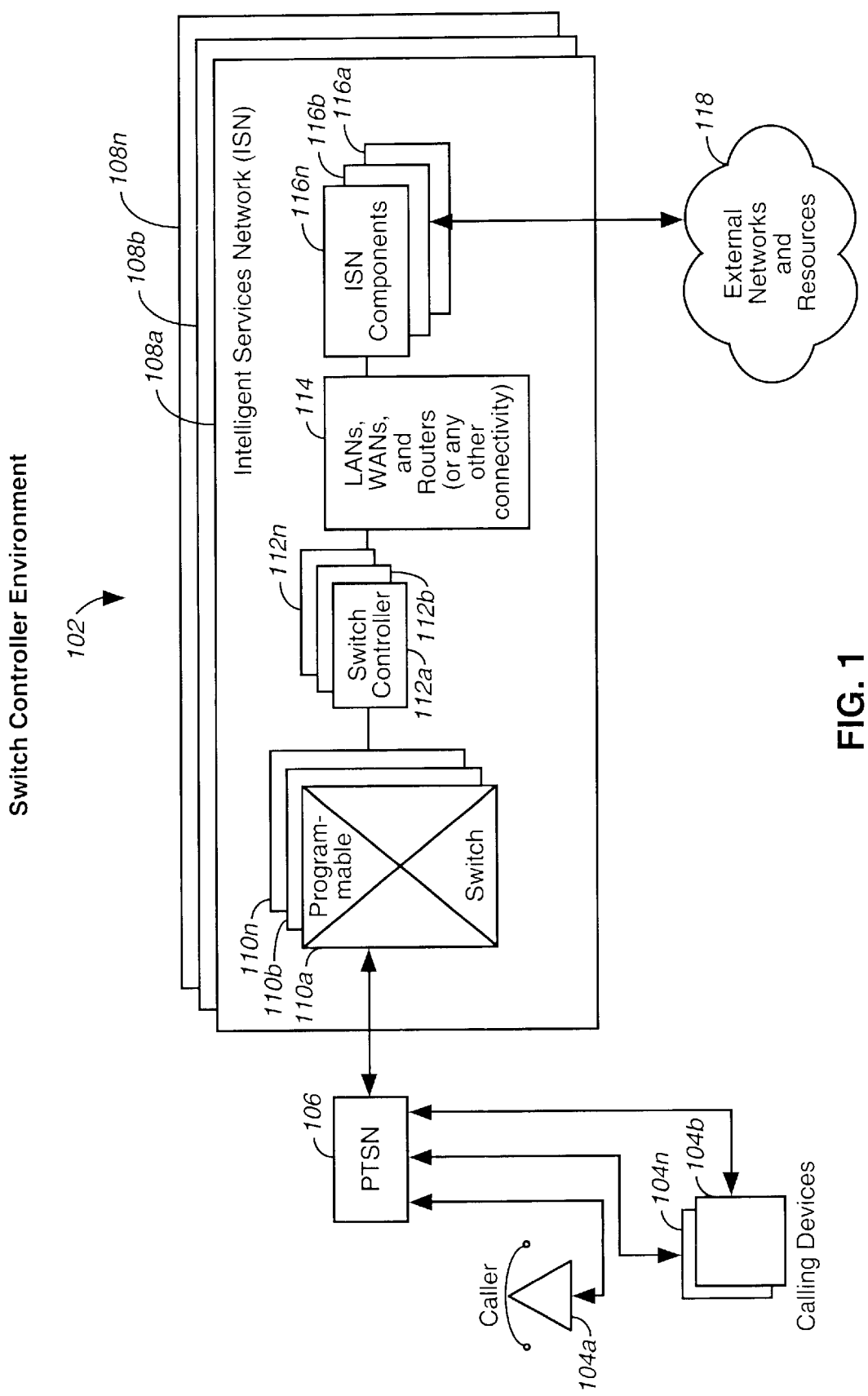
FIG. 1 is a block diagram of a switch controller environment according to one embodiment of the present invention.

FIG. 1 is a block diagram of a switch controller environment 102 according to one embodiment of the present invention. Switch controllers 112a, 112b, . . . 112n are within intelligent service network ISNs 108a, 108b, . . . 108n to provide access for a call initiated via a public switched telephone network (PSTN) 106 to ISN components 116a, 116b, . . . 116n (116) also within ISNs 108. Except as otherwise noted, when elements of the switch controller environment 102 are referred to generally, they will be referred to with a number designation and not a letter designation.

Switch controllers 112 are the central point of control and interface within ISNs 108. The switch controllers 112 are interconnected to programmable switches 110 to provide commands to control programmable switches 110a, 110b, and 110n. The LANs, WANs, and routers (or any other connectivity) 114 are connected to switch controllers 112 and the ISN components 116 to provide connectivity between the switch controllers 112 and the ISN components 116. Exemplary ISN components 116 include manual operator consoles (MOCs), automated response units (ARUs), databases, and protocol converters. The MOCs and ARUs are personal computers (PCS) that interact with a caller to provide operator services, customer services, and other enhanced services. Databases contain stored information and may be a single database or multiple databases connected to and controlled by a server system. Protocol converters are connected to external networks and resources 118 and provide protocol conversion and other processing necessary for interface between the PSTN 106 and external networks and resources 118. Intelligent service networks 108 are described in further detail in copending U.S. patent application Ser. No. 09/096,936, filed Jun. 12, 1998, entitled, "Intelligent Service Network Using a Switch Controller" incorporated herein by reference. The ISN components 116 will be described in further detail with respect to FIG. 2.

The switch controller environment 102 includes components external to ISNs 108. In addition to one or more ISNs 108a, 108b, . . . 108n, the switch controller environment 102 includes one or more calling devices 104a, 104b, . . . 104n (104), such as a telephone, a public switch telephone network (PSTN) 106, and external networks and resources 118. The calling device 104 used by the caller is connected to PSTN 106. The PSTN 106 provides switching and connectivity to the ISNs 108. The ISNs 108 may provide enhanced service functionality, network integration, and other functions. Network integration is illustrated using exemplary ISN component 116b that is connected to external networks and resources 118. External networks and resources 118 include financial processors, information databases, and Internet facilities. Exemplary ISN component 116b provides an interface to one of the external networks and resources 118. In addition to providing connectivity to external networks and resources 118, the ISN components 116 provide enhanced service call processing. Exemplary enhanced services include manual operator service, prepaid calling, calling card, 1-800-COLLECT, and 1-800-MUSICNOW.

The ISN environment 102 can best be described referencing the processing of a typical call. The exemplary call will be for a service that requires human operator intervention. The call is placed by a caller using a calling device 104A. Calling devices 104 are any devices that can place or receive a call. Exemplary calling devices 104 include telephones, facsimile machines, and personal computers.

The call is received by PSTN 106. The PSTN 106 comprises multiple telecommunications networks including local exchange networks and interexchange networks. A local exchange network comprises switches and termination equipment within a localized area. An example of a local exchange network is a local telephone operating company network, such as Bell Atlantic. An interexchange network comprises a plurality of switches, also referred to as exchanges, distributed throughout a geographic area large enough to process long distance telephone calls. For example, a national interexchange network comprises switches located throughout the nation. When the call is routed to either a local exchange network or an interexchange network, the call is routed to one or more switches within the network.

The PSTN 106 is interconnected to a programmable switch 110A within an ISN 108A. Programmable switches 110 have basic switching matrices that provide switching functionality for access to ISNs 108. An ISN 108A may include one or more programmable switches 110 interconnected to one switch controller 112A or to additional switch controllers 112B–112n. Configurations of ISNs are illustrated in more detail in copending U.S. patent application Ser. No. 09/096,936, filed Jun. 12, 1998, referenced above. Programmable switches 110 are dumb switches that can connect ports and process calls based on external commands. Examples of programmable switches 110 include those built by Excel and Summa Four. Excel programmable switches 110 come in sizes ranging from 512 ports to 8,000 ports.

The ISN 108a has a sizable architecture because the number of programmable switches 110 and the configuration of the programmable switches 110 can vary depending on the desired port requirement of the ISN 108a. Programmable switches 110 manufactured by Excel can support various signaling systems such as Signaling System Number 7 (SS7) and can be connected directly to the signaling network of a PSTN 106. If multiple programmable switches 110 are interconnected to one or more switch controllers 112, connections between the programmable switches 110 and the switch controllers 112 may be via a LAN (not shown), such as an Ethernet LAN, using transmission control protocol/internet protocol (TCP/IP). The TCP/IP is used by various data networks including many Internet servers.

Each of the programmable switches 110 is connected to the PSTN 106 via voice telephony trunks, also referred to as lines. Typical telephony trunks are capable of carrying high speed digital data.

The voice trunk connectivity between the programmable switches 110 and the PSTN 106 includes equipment that provides signaling functionality. Equipment within telecommunications networks send signals to each other to communicate information for call processing, such as the origination and destination information, current state of the call processing, equipment being used for the processing, etc. Even if equipment is in-service, if it is incapable of signaling to other equipment, it cannot be used for call processing. Because of the importance of signaling to call processing, sophisticated signaling techniques are used, such as signaling system number 7 (SS7) protocol. Specialized equipment within the telecommunications network (not shown) provides SS7 functionality. Signaling System Number 7 may be implemented using Token ring LANs (not shown) connected to a signal transfer point (not shown). If the programmable switch is not capable of SS7 signaling or other signaling used by the PSTN 106, the ISN 108 architectures may include a signaling gateway between the signaling transfer point and the programmable switches 110 to facilitate in conversion between the signaling used by the programmable switches 110 and the signaling used by the PSTN 106. The current industry standard of SS7 protocol is published in the International Telecommunications Union (ITU) Signaling System Number 7 (SS7) Integrated Services Digital Network (ISDN) User Part (ISUP) NCT1.113 (1995) document and the International Telecommunications Union (ITU) Signaling System 7 (SS7) Message Transfer Part (MTP) NCT 1.111 (1992) document which are incorporated herein by reference in their entirety.

Exemplary switch controller 112a is connected to programmable switches 110 to provide external commands to control call processing. The switch controller 112a provides the commands to exemplary programmable switch 110a carrying the exemplary call to perform call processing functions. When the programmable switch 110a receives the call from the network it sends a message to the switch controller 112a. The switch controller 112a determines the call processing needed and returns commands to the programmable switch 110a.

In addition, the switch controller 112a provides access to ISN components 116. The switch controller 112a interfaces with ISN components 116 via LANS, WANs, routers (or any other connectivity) 114 using network information distribution system (NIDS) sequenced packet protocol (NSPP) on top of user datagram protocol/internet protocol (UDP/IP). The NSPP is a session oriented packet exchange protocol that is implemented over UDP/IP. It is designed to allow rapid information exchange between client applications and NIDS server processes. The use of TCP/IP between switch controller 112A and the programmable switch 110A and the use of NSPP/UDP/IP for communications via LANs, WANs, routers (or any other connectivity) 114 illustrate exemplary protocols but communication is not limited to these protocols.

The ISN components 116 include components that provide enhanced service functionality and connectivity to external networks and sources 118. The ISN components 116 will be described in further detail with respect to FIG. 2.

Figure 2:
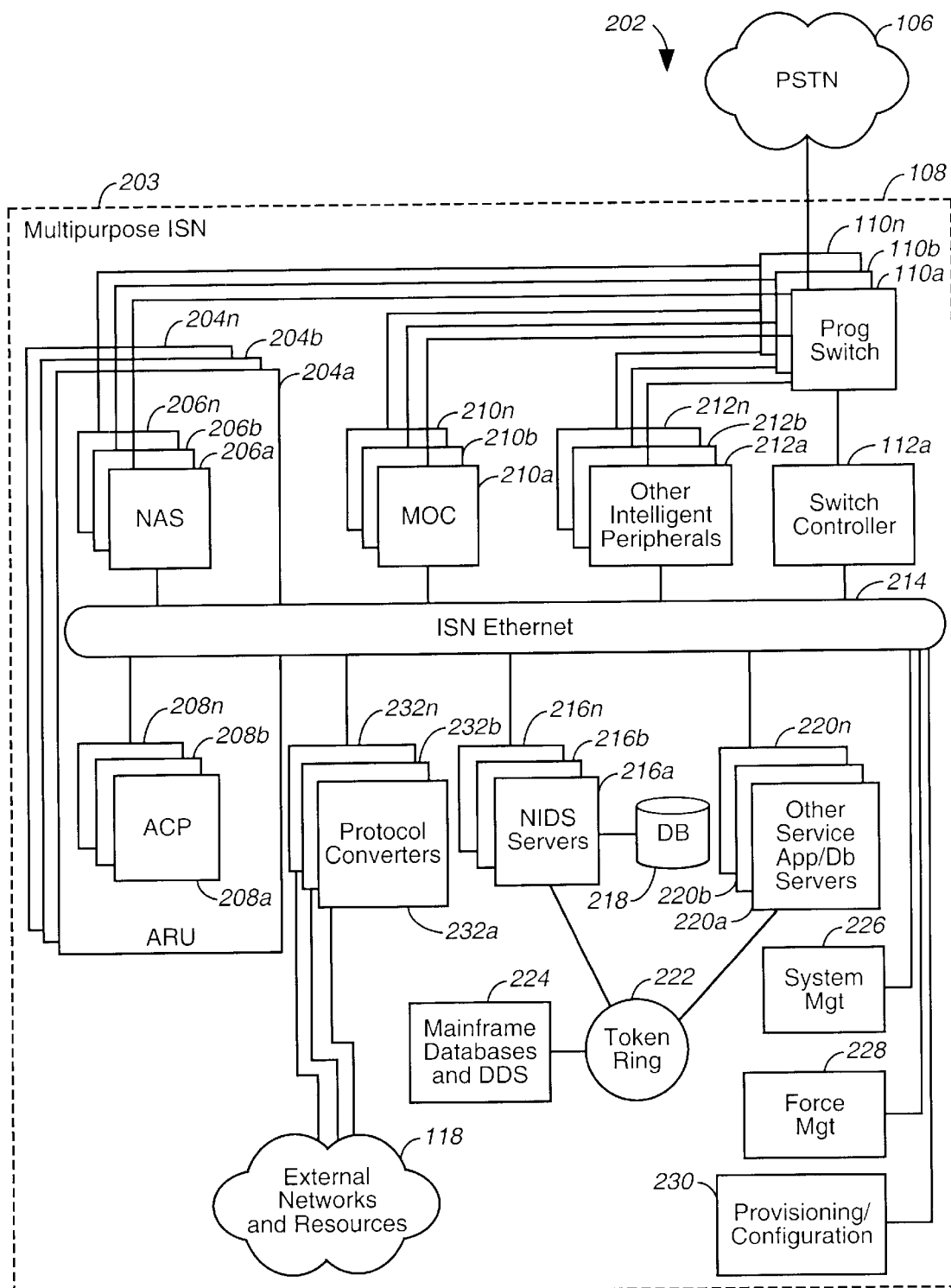
FIG. 2 is a block diagram of a multipurpose intelligent service network according to one embodiment of the present invention.

FIG. 2 is a block diagram 202 of a multipurpose ISN 203. The multipurpose ISN 203 illustrates exemplary ISN components 116 that may be included in ISNs 108. The switch controller 112a has the capability to interface with the various types of ISN components 116 in order to process calls.

In addition to the ISN components 116 and the switch controller 112a, the multipurpose ISN 203 includes one or more programmable switches 110a, 110b . . . 110n (110) that provide an interface via connections to the PSTN 106. The programmable switches 110 are interconnected to the exemplary switch controller 112a. The switch controller 112a is connected to the ISN Ethernet LAN 214 which is one embodiment of LANs, WANs, and routers (or any other connectivity) 114. Except as otherwise noted, when elements of the multipurpose ISN 203 are referred to generally, they will be referred to with a number designation and not a letter designation.

Various types of ISN components 116 include intelligent peripherals, databases and servers, protocol converters 232, and personal computer (PC) systems that provide configuration and management of the switch controller 112a and/or the programmable switches 110. The switch controller 112a includes the capability to interface with the different types of ISN components 116 as will be described in further detail with respect to FIG. 4.

Connected to both the programmable switches 110 and the ISN Ethernet LAN 214 are intelligent peripherals including manual operator consoles (MOCs) 210a, 210b, . . . 210n (210), automated response units (ARUs) 204a, 204b, . . . 204n, and other intelligent peripherals 212a, 212b, . . . 212n (212). The MOCs 210 are PC workstations that are operated by live operators or call center agents to provide operator services, customer services, and other enhanced services requiring human operator intervention. The MOCs 210 are housed in an Operator Network Center (ONC) (not shown). An ONC is a site that houses the MOCs 210. The ONC may be physically remote from the other components of the multipurpose ISN 203. The MOCs 210 are connected to a distinct ONC LAN which is also an Ethernet LAN. The ONC LAN and the ISN Ethernet LAN 214 are connected via routers, and essentially operate as a single LAN, shown as the ISN Ethernet LAN 214 in FIG. 2. The ONC LAN also includes various servers for system monitoring, booting (system initialization), and other applications.

The ARUs 204 are comprised of network audio servers (NASs) 206a, 206b, . . . 206n and automated call processors (ACPs) 208a, 208b, . . . 208n. The ARUs 204 are used to provide automated operator services and interactive voice response services. The ACPs 208a, 208b, . . . 208n (208) are high performance personal or midrange computers that perform intelligent application processing to determine which services to provide. The NASs 206a, 206b, . . . 206n (206) are specialized computers equipped with telephony ports which provide audio responses and collect caller input via dual tone multifrequency (DTMF) signals and voice recognition based on commands provided by the ACP 208. The ACPs 208 communicate with the NASs 206 via LANs, WANs, and routers (or any other connectivity) 114. Each ARU 204 and MOC 210 is connected to one or more programmable switches 110 via voice trunks. Both MOCs 210 and ARUs 204 are also referred to as agents. Other intelligent peripherals 212a, 212b, . . . 212n (212) can be used in an ISN to provide various call services. Other intelligent peripherals 212 are also connected to one or more programmable switches 110 via voice trunks.

Additional examples of ISN components 116 are NIDS servers 216a, 216b, . . . 216n (216) and the NIDS database 218. The NIDS servers 216 are connected to the ISN Ethernet LAN 214 and to the NIDS database 218. A NIDS database 218 stores data related to call processing such as customer accounts and routing translations. When an ISN component 116, such as an ARU 204 or a MOC 210, receives a call, it may query a NIDS server 216 via the ISN Ethernet LAN 214 for data stored in the NIDS database 218. In addition, NIDS servers 216 receive data from mainframe-based systems 224 to be used during real time call processing. Mainframe databases and a data distribution system (DDS) 224 are connected to a token ring LAN 222. The token ring LAN 222 is connected to the NIDS servers 216. Order entry and data management functions are performed within mainframe based systems 224. Mainframe computers are used as the databases of record for call processing data. The DDSs distribute call processing data stored in mainframe computers over a token ring LAN 222 to each NIDS server 216. In addition, other service application database servers 220a, 220b, . . . 220n (220) are connected to the ISN Ethernet LAN 214 and to the token ring 222. An exemplary other service application database server 220 is a server to process prepaid calls.

The ISN components 116 also include protocol converters 232a, 232b, . . . 232n that convert between various telecommunications protocols. Protocol converters 232 provide protocol conversion between different protocols such as TCP/IP, NSPP on top of UDP/IP, and packet switching protocols, such as X.25. Exemplary components that perform protocol conversion are the advanced intelligent network gateway (AIN) described in U.S. patent application Ser. No. 08/967,339, filed Oct. 21, 1997, now U.S. Pat. No. 6,229,819, entitled, "Advanced Intelligent Network Gateway", and the validation gateway described in U.S. patent application Ser. No. 08/956,220, filed Oct. 21, 1997, now U.S. Pat. No. 6,160,874, entitled, "Validation Gateway," incorporated herein by reference. The capabilities of the components described in the previously referenced applications are not limited by the examples given and are defined by the scope of the claims in the applications.

Protocol converters 232 are connected to external networks and resources 118. Exemplary external networks and resources 118 include financial processors with credit card information, the Internet, and other databases, such as those used in processing international calls.

Additional ISN components 116 include computers for system management 226, force management 228, and provisioning/configuration 230. Each of these systems may be implemented on a different computer, such as a PC workstation, as is shown in FIG. 2. Alternately, they can be embodied on the same computer workstation, and can even be the same process and GUI. System management 226 includes system monitoring of the switch controller 112A and the programmable switches 110, collection of alarms, call state monitoring, call state triggering, resource monitoring, and resource state triggering. Force management 228 is the management and monitoring of a ONC's work force (i.e. agents). Force management 228 receives a download of statistical and historical agent information through the interface and uses the information to monitor and manage the agent population supported by the switch controller 112a. Provisioning and configuration 230 includes the provisioning and configuration of programmable switch resources 110 (i.e. ports), ARU 204, MOC 210, and other intelligent peripheral 212 resources, and other resources. Computers that perform system management 226, force management 228, and provisioning/configuration 230, are connected to the ISN Ethernet LAN 214. This provides an interface to the switch controller 112.

Additional information concerning ISN components 116 is provided in copending U.S. patent application Ser. No. 08/956,232 filed Oct. 21, 1997, now U.S. Pat. No. 6,188,761, entitled, "A System and Method for Providing Operator and Customer Services for Intelligent Overlay Networks," incorporated herein by reference.

Figure 3:
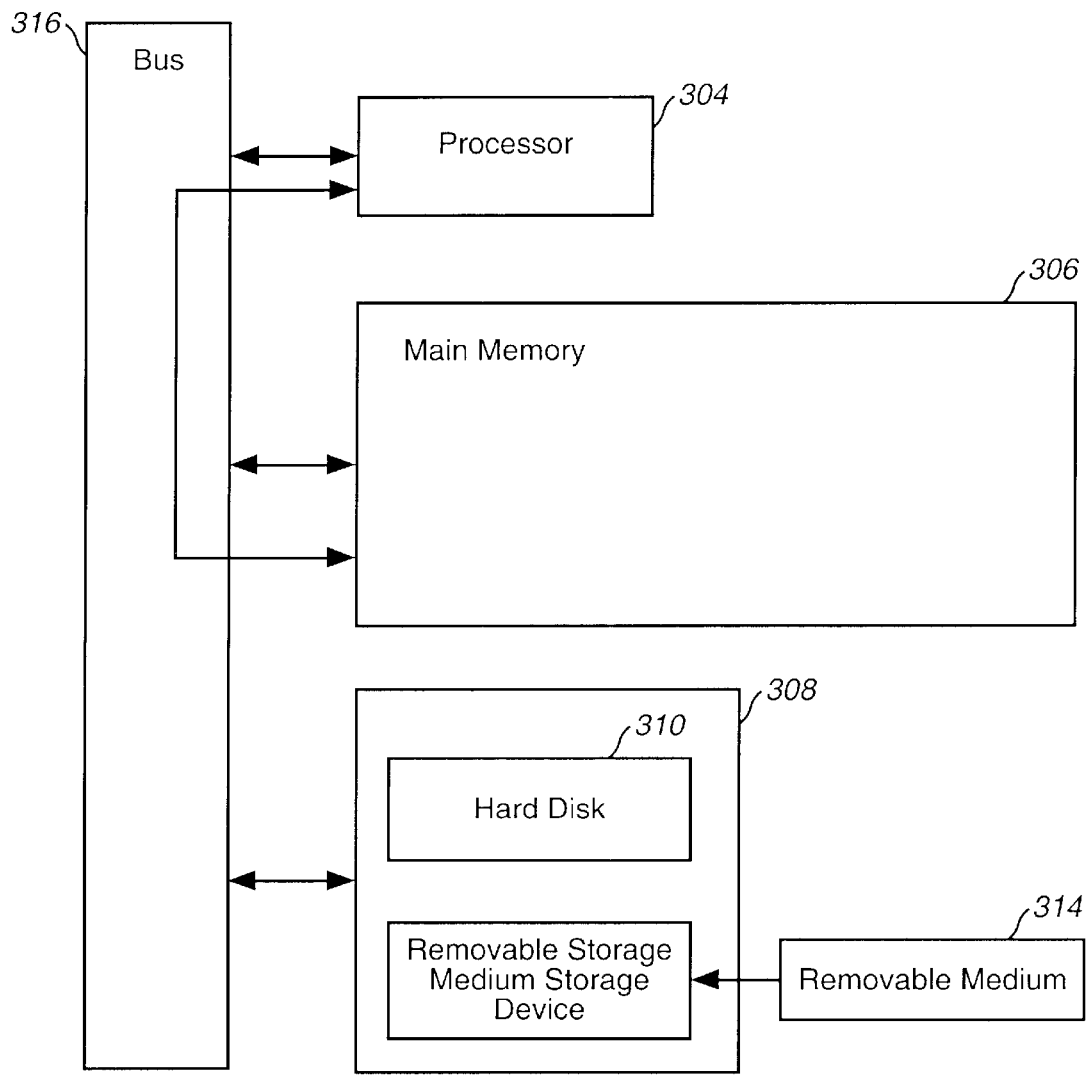
FIG. 3 is a block diagram of a switch controller hardware configuration according to one embodiment of the present invention.

FIG. 3 is a block diagram of the hardware configuration of an ISN 108. The switch controller 112, programmable switches 110, and ISN components 116 of the present invention are preferably implemented using computer systems as shown in FIG. 3. A computer system includes a processor, such as processor 304 connected to bus 316. Also connected to bus 316 is main memory 306 (preferably random access memory, RAM) and secondary storage devices 308. The secondary storage devices 308 include, for example, a hard drive 310 and a removable storage medium drive 314 (such as a disk drive, for example).

The application programs of these components are preferably computer programs that reside in main memory 306 while executing. When executing, the computer programs enable the computer system to perform the features of the present invention as discussed herein. Thus, the application program represents a controller of the computer system (and of the processor 304). Alternately, the application program is predominately or entirely a hardware device, such as a hardware state machine.

In one embodiment, the present invention is a computer program product (such as removable storage medium 314, representing a computer storage disk, compact disk, etc.) comprising a computer readable media having control logic recorded thereon. The control logic, when loaded into main memory 306 and executed by processor 304, enables the processor 304 to perform the operations described herein.

Figure 4:
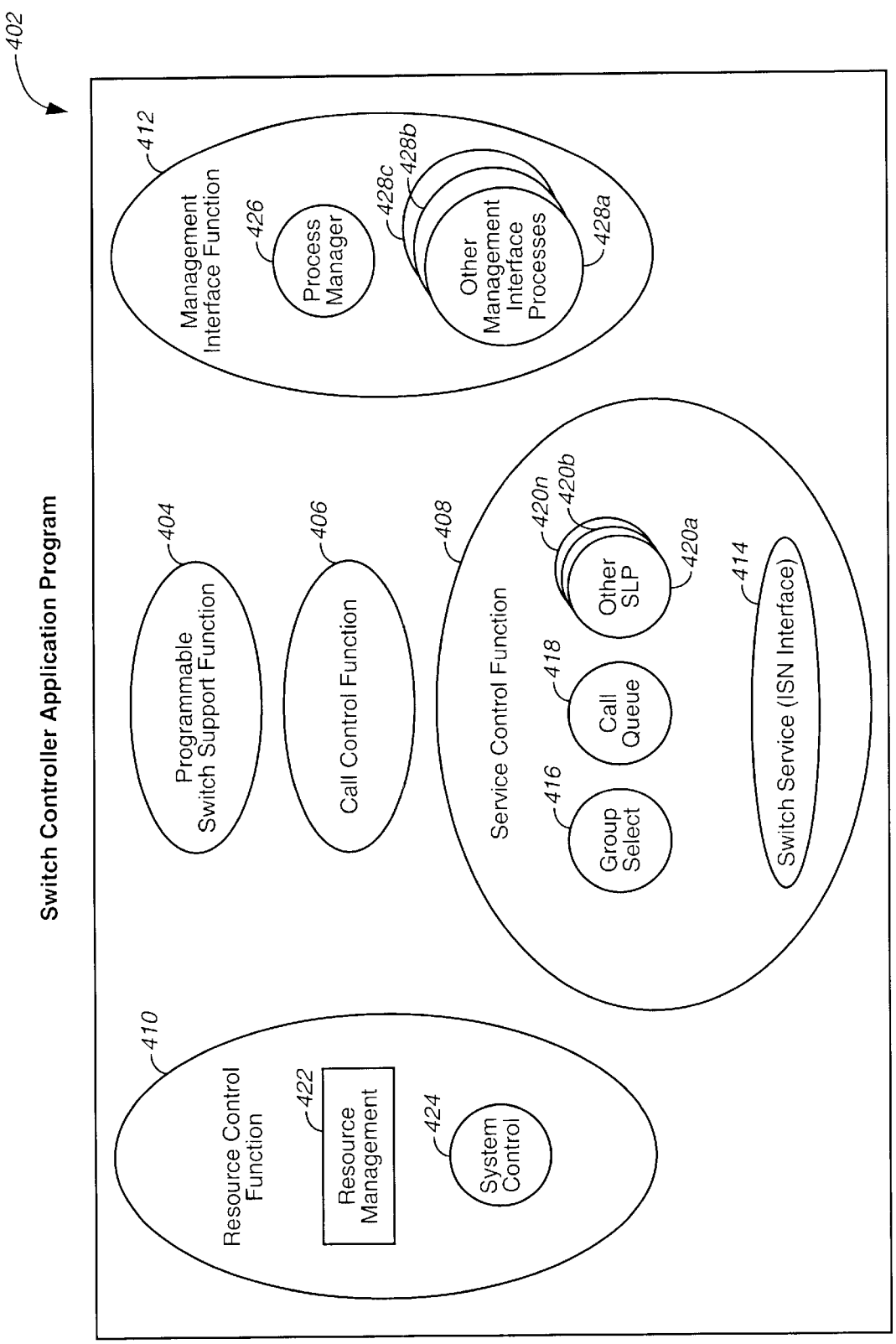
FIG. 4 is a block diagram of a switch controller application program according to one embodiment of the present invention.

FIG. 4 is a block diagram of switch controller application program 402. The switch controller application program 402 resides in memory of the switch controller 112. The switch controller application program 402 may reside in main memory 306 or in a secondary memory device 308 such as the hard disk 410a or the removable medium 314. The switch controller application program 402 resides in memory while executing. The switch controller application program 402 is executed by processor 304.

The switch controller application program 402 comprises multiple routines. Software routines, also referred to as functions and processes, are elements of a computer program or application program. Software routines are sub-sets of a computer program or application program (i.e., groups of lines of code) that perform one or more functions. The software routines within the switch controller application program 402 form the computer software code of the switch controller application program 402 and reside in memory while executing. Software routines are processed by processor 304 during processing of the switch controller application program 402.

The software routines of the switch controller 112 are categorized into five functions: programmable switch support function 404, call control function 406, service control function 408, resource control function 410, and management interface function 412. Communication between the software routines of the switch controller 112 is performed using switch controller application programmer interface (SCAPI) messages. The switch controller application programmer interfaces and SCAPI messaging is described in further detail in copending U.S. patent application Ser. No. 09/096,937, filed Jun. 12, 1998, entitled, "Switch Controller Application Programmer Interface" incorporated by reference herein.

The programmable switch support function 404 provides an interface between switch controller 112a and a programmable switch 110a. The programmable switch support function 404 translates messages between a generic switch controller application programmer interface (SCAPI) message format and programmable switch API message format, manages message header/trailer requirements, and controls connectivity to the programmable switch 110. The generic SCAPI message format is used for messages transmitted between the routines of the switch controller application program 402 within the switch controller 112a. Further description of the programmable switch support function is provided in Table 1 below.

TABLE 1

Switch Support Module Functions

| Function | Description |
| --- | --- |
| Translation of Switch Controller "generic" messages to/from Excel specific format | One to one translation between Switch Controller API message format and Excel message format. ISUP messages are passed unmodified to the Call Control process. The programmable switch support function encodes and decodes the matrix specific message set, extracts call processing information from the messages, and encodes/decodes the messages in the generic Switch Controller API (SCAPI) format. |
| Manage Excel message header/trailer requirements | Hides switch-specific interface details, such as API message framing, checksum, retries, sequence numbers. For messages sent to the programmable switch, generate the framing and sequence numbers required for each message and generate the trailing checksum. |
| Routing of translated Excel messages to the appropriate process | Switch management and status messages are routed to the System Control process. Call Control messages are routed to the Call Control Process. Switch alarm messages are routed to the System Management Interface process. |
| Controlling connectivity to the Excel switch (Switch management) | Initiate and manage redundant TCP/IP socket connections to the active and standby switch matrix CPUs. Responding to Excel switch "poll" messages. Comparing consecutive "poll" messages for a change in state which requires notification to the System Control process. |
| Implementing "macro" switch control functions for the System Control Process | "Initialize" macro request, which attempts a connection to the switch, compares the latest poll information to the initialization parameters and possibly performs the following steps: Setting the internet protocol (IP) address of each Switch CPU. Downloading the system software. Re-connecting to the switch matrix. Compare the status returned in the poll message and acknowledge the System Control. Report any errors to the System Control. Configure macro request, which provides: An ordered list of configuration files are read and parsed in a serial fashion. As the file is parsed, Excel configuration messages are encapsulated with the appropriate header and trailer and transmitted to the switch. All errors are reported to the System Control, indicating that the affected resources did not configure properly. Once all files are parsed, acknowledge the System Control process. |

The call control function 406 provides service independent call processing. The call control function 406 is designed generically and is not service specific. Service specific features are handled by the service control function 408. The call control function 406 includes a call state machine that is used for call processing. The call state machine performs call processing by analyzing call processing information with respect to the current state as defined by the basic call state machine model. The call state machine will be described in further detail with respect to FIGS. 6 and 7.

The call control function 406 performs various functions including but not limited to: detecting an incoming call, creating an originating call model, collecting originating dial digits, requesting analysis of the digits, selecting trunk groups, creating a terminating call model, composing and sending messages to the terminating agent or party, detecting Integrated Services Digital Network User Part (ISUP) messages, detecting disconnect signals, and triggering enhanced services. The ISUP messages are described in further detail with respect to FIG. 5. The call processing functions performed by the call control function 406 are described in further detail in Table 2.

TABLE 2

Call Processing Functions of Call Control Function

| Function | Description |
| --- | --- |
| Detect incoming call | Arrival of initial setup message from the network (e.g., initial address message IAM) |
| Originator allocation | Creating Originating call model (may be basic call state model) |
| Receive digits | Collecting originator dialed digits (from IAM) |
| Translate digits | Request analysis of the digits to determine an Operator group to handle the incoming call |
| Router | Select the right trunk group |

TABLE 2-continued

Call Processing Functions of Call Control Function

| Function | Description |
|---|---|
| Terminal allocation | Creating Terminating Call Model |
| Signal terminating agent | Compose and send messages to the terminating agent |
| Detect answer | Detect answer message; Collect billing data |
| Detect disconnect | Detect disconnect message; Collect billing data |
| Trigger features and services | Analyze static criteria in order to initiate feature and service processing allow per call criteria to be set via a well defined set of rules in order to initiate feature and service processing |

The call control function 406 allocates a region of memory, referred to as a call data block. The call data block is used as transient storage for call data. Data in the call data block is accessible to the other switch controller application program 402 functions. Use of the call data block allows the service specific processing to be performed by a function, specifically the service control function, that is separate from the call control function 406. The call data block is a table within resource management 422. Data in the call data block is accessed using resource management application programmer interfaces. The call data block will be described in further detail in copending U.S. patent application Ser. No. 09/096,939, filed Jun. 12, 1998, entitled "A System and Method for Resource Management" incorporated by reference herein in its entirety. Data stored by the call data block is described further in Table 3.

TABLE 3

Call Data Block Information

| Call Data Block Information | Description |
|---|---|
| Call Identifier | A unique ID which is given to a call within the network |
| Call State | The call state (e.g., call setup, speech, etc.) |
| Leg Identifiers | ID of legs in the call |
| Leg States | States of legs in the call |
| Originating Call Model Record Pointer | A pointer to the call record associated with the originating call model |
| Terminating Basic Call Model Record Pointer | A pointer to the call record associated with the terminating call model |
| Billing Time Points | Time stamps generated during a call that are used to determine the appropriate charge to be billed to the customer. |
| Call Statistics | Statistics for total calls handled by the call control function 406 for a specified period of time. Call statistics are useful for performance information and capacity requirements. |

As shown in Table 3 above, billing time point data is stored in the call data block. Billing time point data is one or more time stamps that are generated during the call. The time stamps indicate that progress of the call which is used to determine the appropriate charge to be billed to the customer. For example, if a customer's call proceeds to an agent position but the agent does not complete processing, the customer may be billed differently than both a customer that simply initiated a call but did not proceed to an agent position and a customer that completed a call. The billing time points stored in the call data block are shown in Table 4 below.

TABLE 4

Billing Time Points

| Time Stamps Generated | Description |
|---|---|
| TP1 | The time Switch Controller detects an incoming call |
| TP4 | The time a call is offered to an Agent Position |
| TP6 | The time the Agent port is done with the call |
| TP6 | The time which Switch Controller detects an Answer |
| TP7 | The time which Switch Controller detects Re-organization DTMS sequence |
| TP7 | The time which Originator Disconnects |
| TP7 | The time which Terminator Disconnects |
| TP7 | The time which call Park Timer expiration |
| TP7 | The time Switch Controller transfers a call to another Switch Controller if there are no Manual (or Automated) Operators to handle the incoming call |

Call statistics are also stored in the call data block 1 (shown in Table 3). Call statistics are calculated for total calls handled by the call control function 406 for a specified period of time. An exemplary call statistic is the number of calls processed successfully by the call control function 406. Call statistics are useful for performance information and capacity requirements. Additional call statistics are shown in Table 5 below.

TABLE 5

Call Statistics Maintained by the Call Control Module

Call attempt notification
Calls receiving Congestion Treatment
Calls processed successfully
Billing timepoints
Processor outage statistics
Busy Hour Statistics
Total number of calls that were in queue and got abandoned due to timeout
Time before call was answered
Operator statistics (operator connect time, type of call, number of transfers)
Real time statistics (queue statistics, agent status)
Total number of trunk group congestions A subset of the call statistics is alarm and notification data. Alarm and notification data is collected and used to produce the call statistics shown in Table 5 above. Alarm and notification data tracked by the call control function 406 is shown in Table 6 below.

TABLE 6

Alarms and Notifications Tracked by the Call Control Function

| Alarm/ Notification Type | Alarms and Notifications Tracked | Configurable Components |
|---|---|---|
| Call Abnormally released | Queue timeout<br>Queue overflow<br>No route available<br>All routes busy<br>Vacant destination number (DN) (no translation)<br>Protocol timeout<br>System failure<br>Invalid Call State<br>Long Call Disconnect | Severity Level,<br>Alarm Description,<br>Action<br>Recommendation |
| Call Control Failure | Low memory<br>Message Buffer High Water Mark | |

TABLE 6-continued

Alarms and Notifications Tracked by the Call Control Function

| Alarm/Notification Type | Alarms and Notifications Tracked | Configurable Components |
|---|---|---|
| | Corrupt Call State | |
| | Call congestion | |
| | Switch outage | |
| | Queue Congestion | |
| | Resource Congestion | |
| Invalid Event/Message | | Severity Level, Alarm Description, Action Recommendation |
| Recovery Mode | | Severity Level, Alarm Description, Action Recommendation |

The service control function 408 includes a switch service process 414 which is an interface to the ISN components 116 and one or more service logic programs that provide enhanced service call processing. The service logic programs include group select 416, call queuing 418, and other service logic programs 420a, 420b, . . . 420n.

The use of service-specific service logic programs within the service control function 408 hides service-specific features from the remaining call processing functions. Service logic programs provide flexibility to the switch controller 112 design because new services can be added by simply adding a service logic program rather than modifying the call control function 406 and functions that interact with the call control function 406.

The group select service logic program 416 assists in routing calls by identifying groups of ports associated with the type of ISN component 116 needed to process the call. For example, if a call requires processing with an intelligent peripheral, such as a manual operator console 210, the group select service logic program 416 determines the groups of ports on the programmable switches 110 associated with manual operator consoles. As shown in FIG. 2, intelligent peripherals have voice circuit connections with ports on the programmable switches 110. Programmable switch 110 ports are grouped by the type of intelligent peripheral to which the port terminates. The group selected service logic program 418 determines the port groups of the intelligent peripheral type needed to process the call. The type of intelligent peripheral required is determined by analyzing the incoming digits.

A second service logic program used for call routing is the call queue service logic program 418. After the type of ISN component 116 needed to handle the call is determined, the call queue service logic program 418 uses an algorithm based on availability to determine which group, among the groups corresponding to the needed type of ISN component 116, should receive the call. The call queue service logic program 418 has the capability to send the call immediately to an available ISN component 116 or to queue the call to a group. Queuing a call holds the call for a period of time and perhaps apply treatment (i.e., play music). Call queues are managed based on thresholds such as a threshold number of calls that may be in a queue. If a call comes into an ISN 108 and all of the queues for the type of ISN component 116 needed to process the call have the number of calls specified by the threshold, the call will be transferred to another ISN 108 or the caller will be denied the ability to place the call. The call queue SLP 418 generates the commands needed to hold the call in queue on the programmable switch 110, determines call treatment, determines how long a call should be queued, determines when a queued call should be dropped, and determines if a queued call should be transferred.

Additional information about each of the processes within the service control function 408 is provided below in Table 7.

TABLE 7

Processes of the Service Control Function

| Process | Description | Major Functions |
|---|---|---|
| Switch Service Module | The Switch Service process serves as the interface process between ISN components and the other processes within the Switch Controller. This process implements NIDS server interface towards ISN MOC and ARU clients | NIDS session maintenance Transmission control (TC) message encode and decode -- Messages to ACP and MOC are converted from internal SCAPI format to TC format. Routing of TC message to/from internal Switch Controller processes: Call processing related TC message from ACP and MOC are passed to Operator Service Logic process within the Switch Controller. Agent status related messages are passed to System Control Process within the Switch Controller Service Logic Program Interface Send and receive modules that provide timing and interface with UDP/IP and TCP client |
| Group Select Module | Group select process implements business-specific algorithm for selecting ISN component groups to handle incoming calls. Group selection of ISN components provides the ability to route incoming calls to the correct type of ISN component based on the incoming call parameters such as access number. The call control function requests this process to obtain groups that are associated with ISN components that can handle a particular incoming call. This process consults its internal group select tables and returns the group identifier. | Maintain ISN component groups per product or service supported. Analyze incoming call parameter such as access number to select a group. Maintain group statistics. Map terminal identifier (TID) to a voice port. |
| Call Queuing Module | The process checks the availability of ports on the ISN components within a group. It implements the logic to queue the process when no port is immediately available. The call control function requests this process for an available port within a specific group. | Determine using algorithm if port available If no port available, queue call and set timer If port becomes available before expiration of timer, allow call to proceed If timer expires, release call Notify the call control module Every queue is configured with a queue timer that determines the maximum duration the call can wait in the queue Queue parameters such as length of the queue and queue timer are configur- |

TABLE 7-continued

Processes of the Service Control Function

| Process | Description | Major Functions |
|---|---|---|
| Operator Service Logic Module | This process receives call processing related messages from the Switch Service process. These operator specific features are implemented in this process as service state event machines. These state event machines interact with the generic call control state event machines within the Call Control process to implement operator specific features such as conference, blind transfer and third-party call. | able as well as changeable through a System Management Console Sending/receiving call processing SCAPI messages to/from switch service process Implements state event machines for operator services such as conference, transfer, etc. Interact with call control function to implement operator specific features |
| Network Service Logic Module | This process implements network specific features such as Called SubHeld Timer and Called SubAnswer Timer. Called SubHeld Timer and Called SubAnswer Timer are timers used during call processing to hold the call for a period of time. | Called SubHeld Timer is started when the called party releases. Call is not actually released until the timer expires. Before the timer expires, the called party can reconnect. Called SubAnswer Timer defines the duration of "ring No Answer" state on the terminating end. |
| Prepaid Service Logic Program | The Prepaid Service Logic Program implements the processing for prepaid service that resides within the switch controller | Prepaid timer logic. Timer started for the duration specified by the Prepaid ACP. Active calls will be interpreted at a configurable time before the expiry of this timer Warning announcement is initiated by this process at the expiration of warning timer When a prepaid call terminates, this process: Cancels prepaid timer Encodes Prepaid Call Completion message Interfaces with transmission control protocol (TCP) client process within the switch service to send the Prepaid Call Completion message to Prepaid Service |
| Automatic Trunk Routing Service Logic Program | This process implements the trunk test and product test requirements. | Automatic Trunk Testing: Recognize an incoming test call by specific pattern in the called number field and route it to a pre-configured test port. After this connection, the Automatic Trunk Test equipment at either end may exchange in-band test tones to measure loss, voice quality, echo etc. Call Simulation and Product Testing: Allow test calls to be set up from test trunks. The incoming test call parameters such as relevant SS7 fields and other service parameters such as card number, can be set up via specific screens on the System Management Console. Allow specific trunks to be taken in and out of service for testing Allow test Operator Group and assignments from System Management Center (SMC) for Operator Training and product testing |

The resource control function 208 includes two processes. The first is the system control process 424, which is in charge of monitoring the states of a call and service-related resources. This system control process 424 is centrally aware of the resource state and general health of the switch controller. The system control process 424 is described in further detail in Table 8 below.

TABLE 8

System Control Module Functions

| Resource | Function Preferred |
|---|---|
| Agents | Agent Registration<br>Dynamic Agent Status Update<br>Initiates switch download and configuration when enough agents are logged in<br>Instructs the call queue process when an agent becomes available |
| Programmable Switch | Receives Programmable Switch Alarms and updates the status of affected resources<br>Maintains the Programmable Switch Configuration map<br>Initiates programmable switch resource "discovery" process to synch up internal resource map with the currently active state at the programmable switch matrix<br>receives "resource delete" or "resource update" messages from the system network management protocol (SNMP) agent and if they are for switch resources, instructs the programmable switch support function to communicate to the switch matrix<br>receives "Get resource status" messages and interacts with programmable switch support function to initiate querying of the switch matrix |
| Switch Controller | Maintains the Switch Controller state of operation, including recovering:<br>a "Switch Controller Ready" message from process manager which may initiate a switch download and configuration operation<br>When enough agents have logged in, instructs the programmable switch to accept incoming calls via programmable switch support function<br>Monitors resources, initiates incoming call throttling mechanism when the resource utilization exceeds configured threshold |
| System Wide | Monitors system-wide abnormal events and reports to System Management Console<br>Capacity Overload is monitored of the capacity of the<br>Processor<br>Process table<br>Memory<br>Shared Memory<br>Inbound/Outbound trunks<br>IMT trunks, and<br>Operator position<br>Abnormal System Events are monitored such as failure during<br>Initialization<br>Configuration<br>Activation, and<br>Run time faults/invalid events<br>Forced clearing of resources are monitored, such as |

TABLE 8-continued

System Control Module Functions

| Resource | Function Preferred |
|---|---|
| | Programmable switch channel purges, and Call Control function initiated purges |

The second is the resource management process 422. Exemplary switch controller resource management functionality includes management of both system-related resources such as message queues and a call data block table, as well as network resources such as the programmable switch matrices and agent resources. The resource management process 422 is described in further detail in copending U.S. patent application Ser. No. 09/096,939, filed Jun. 12, 1998, entitled "A System and Method for Resource Management" referenced above. A summary of resource management 422 functions are provided in Table 9 below.

TABLE 9

Resource Management Functions

Static and dynamic resource allocations
Read and Write access to resource data
Cross referencing between related resources
Data integrity
Create and manage message queues
Create and manage agent and group tables
Create and manage call-related information
Create and manage switch resources The management interface function 412 includes two functional areas of monitoring control. The system monitoring functionality encompasses the generation of system alarms which allows a system management console (SMC) to monitor the status and run-time operation of the switch controller software. The management interface function 412 also includes the process manager 426, which is responsible for initial startup and health of individual processes which make up the switch controller 112. In addition, the management interface function 216 provides interfaces to the external management systems, including the system management system 226, the force management system 228, and the provisioning/configuration system 230. Additional description of the processes within the management interface function 412 are provided in Table 10 below.

TABLE 10

Management Interface Function

| Process | Description | Function |
|---|---|---|
| System Management Interface | The Switch Controller System Management design includes the two main functional areas: (1) monitoring and (2) control. The system monitoring functionality encompasses the generation of system alarms, which allow the System Management Console to monitor the status and run-time operation of the Switch Controller software modules. The Switch Controller system monitoring functionality is implemented using several software interfaces and system processes. The system control functionality uses a system network management protocol (SNMP) agent design and provides the system administrator with the ability to control Switch Controller resources during run-time operation of the Switch Controller. | Alarm monitoring Real Time monitoring System Management Console SNMP Agent Data Processing |
| Process Manager | The Process Manager is responsible for the initial startup and health of the individual processes which make up the Switch Controller. Once the Process Manager starts up, it determines the initialization, configuration, and activation order for each process within the Switch Controller. A configuration file is read and internal initialization is performed. After initialization is complete, this process is ready to accept system operation commands through a human machine interface (HMI) interface. These commands are used to start up and shut-down the Switch Controller. In addition, this process also monitors the health of the individual processes through a heart-beat mechanism. | This is the parent process for all the other Switch Controller processes. This process supports a UNIX Curses based HMI interface that is used to start up and shutdown the Switch Controller. Commands are also supported to start up or shutdown any specific process within the Switch Controller. On startup, this process reads its configuration file that provides System Information as well as individual process related information. |
| Force Management Interface | This interface is used to monitor and manage the Agent population supported by the Switch Controller. | Switch Controller provides the API to allow an external Force Management System to query agent-related information. The API set allows down-load of statistical and historical agent information through a Force Management specific interface. |
| Switch Configuration Utility | The switch configuration utility is a stand-alone utility that provides a user-friendly way of creating switch configuration files. This utility is not responsible for changing the state of resources inside the programmable switch. Changing the state of resources is performed by the System Management Interface. The output of this utility is Switch Configuration file. | The Switch Configuration utility will provide the ability to configure the following entities/resources: Programmable switch load file/system configuration Timing Synchronization Card Configurations Span Configuration Logical Span ID Span framing parameters PCM encoding configuration DSP Configuration Assignments Tones Announcement File Download assignment Conference Port requirements/assignment Channel/Trunk group Configuration CIC assignment -- Trunk group assignment PPL download/ configuration/assignment Protocol/PPL assignments Outsize/Insize configuration Answer supervision configuration Release supervision configuration SS7 Configuration Links |

TABLE 10-continued

Management Interface Function

| Process | Description | Function |
|---------|-------------|----------|
|         |             | Linksets |
|         |             | Routes   |
|         |             | Stacks   |

The process manager 426 is the parent process for the other switch controller application program 402 processes. The process manager 426 is responsible for the initial start-up and shutdown of the switch controller 112. Initial start-up is performed in part by reading a process manager configuration file. Provided below in Table 11 is the information included in the process manager 426 configuration file.

TABLE 11

Process Manager Configuration File

| Type of Information | Parameters |
|---------------------|------------|
| System Information  | Number of processes<br>List of Processes<br>Activation order<br>Process startup Retry limit and Retry timer<br>Shared memory size<br>Number of queues |
| Process Information | name of process<br>number of instances of the process to run<br>well-known message queue ID<br>heartbeat send interval<br>command line arguments |

Figure 5:
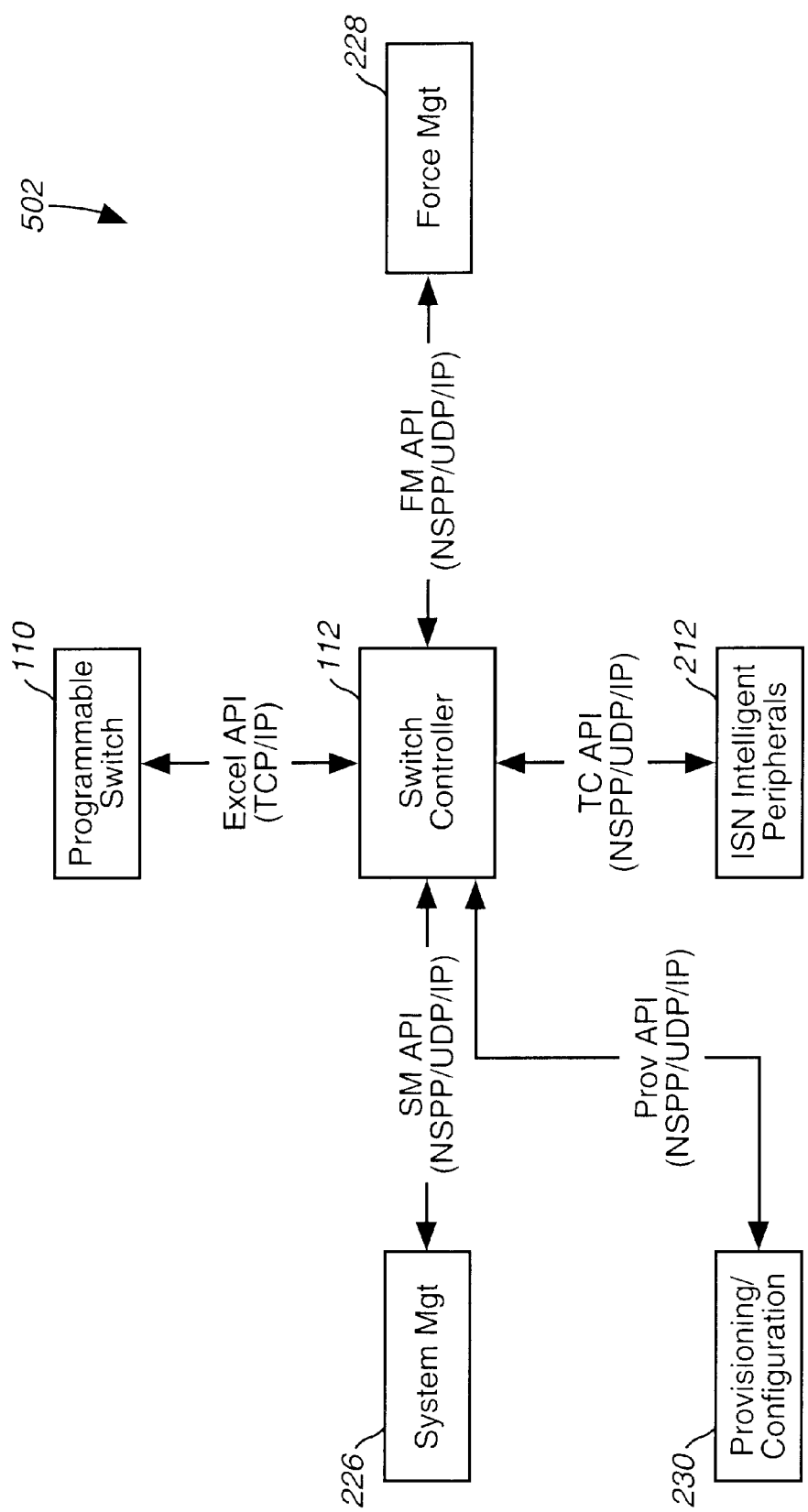
FIG. 5 is a block diagram of an intelligent service network message interface according to one embodiment of the present invention.

FIG. 5 is a block diagram of the ISN message interface 502. The ISN message interface 502 illustrates the external interfaces of the switch controller 112. The switch controller 112 communicates with the programmable switch 110 via TCP/IP over either a direct cable connection or a LAN (not shown). The switch controller 112 sends messages in an application programmer interface (API) messaging format that is specified by the programmable switch 110 vendor. For example, if an Excel programmable switch is used, then an Excel API is used. The Excel programmable switch API is described in a document entitled, "Excel API specification revision 5.0."

The programmable switch 110 uses ISUP messaging in communications with the PSTN 106. The ISUP messaging is part of SS7, and references a layer of SS7 messaging used to perform ISN type services. The switch controller 112 controls functions needed for call set-up including performing call processing and allocating facilities, such as programmable switch 110 channels and ports and ISN components 116.

TABLE 12

ISUP Messages Sent Between the Programmable Switch and the Switch Controller

| Abbreviation | Message Name | Description |
|--------------|--------------|-------------|
| IAM | Initial Address Message | The Initial Address Message contains the digits identifying the called and calling parties, the type of network connection required, the characteristics of the calling party (payphone, etc.), and the characteristics of the call type (voice, data, fax, etc.). For inbound calls, the switch controller is mainly concerned with the called and calling party numbers which identify the product and operator group required to support the call. |
| ACM | Address Complete Message | The Address Complete Message contains the backwards acknowledgment through the network that the requested facilities in the IAM have been provided and where compromises were made (satellite hops, etc.). Additionally, the ACM indicates to the intermediate nodes that voice should be provided in the backwards direction of the call. |
| ANM | Answer Message | The Answer Message indicates that the call has been answered by the called party and indicates to the intermediate nodes that two way voice path should be provided. |
| REL | Release Message | The Release message indicates that one party in the call has requested to release the connection. Additionally, the REL message may contain various cause codes which indicate the reason for the termination of the call (normal and many possible abnormal conditions). |
| RLC | Release Complete | The Release Complete message indicates that a request for REL is granted from the previous nodes in the call and that the resources assigned to the call shall be released. |
| SUS | Suspend Message | The suspend message indicates temporary suspension of an active call. |
| RES | Resume Message | Follows a suspend message to indicate that suspended call is resumed. |

The switch controller 112 communicates with each ISN component 116 via NSPP/UDP/IP over the ISN Ethernet LAN 214. The NSPP messaging is used to implement an API referred to as transmission control (TC) messaging. The TC messages include messages needed for communication between the switch controller 112 and the various ISN components 116 to handle a call. For example, for a switch controller 112 to route a call to a particular ARU 204 port, the switch controller 112 sends a "Call Offered" TC message to that ARU 204. The messages that are part of the TC API are included in the table below.

TABLE 13

TC Messages

| TC Message | Message initiating component → message reviewing component | Description |
|------------|-----------------------------------------------------------|-------------|
| TC_Call Offered | Switch Controller → MTOC/ACP | New Call offered to the platform |
| TC_Release | MTOC/ACP → Switch Controller | To release a call leg |
| TC_Conference | MTOC/ACP → Switch Controller | Conference in a terminating party |
| TC_Call Park | MTOC/ACP → Switch Controller | Park an active call and start call park time |
| TC_Count | MTOC/ACP → Switch | Connect an originator and |

TABLE 13-continued

TC Messages

| TC Message | Message initiating component → message reviewing component | Description |
|---|---|---|
| | Controller | terminator and drop off operator |
| TC_Logon | MTOC/ACP → Switch Controller | Logon an Operator |
| TC_Layoff | MTOC/ACP → Switch Controller | Logoff an operator |
| TC_Update | MTOC/ACP → Switch Controller | Update status of Operator (Ready/Not Ready) |
| TC_On_Hold | MTOC → Switch Controller | Hold the specified leg (on and off hold) |
| TC_Off_Hold | MTOC → Switch Controller | Take a leg off hold |
| TC_Answer | Switch/Controller → ACP/MTOC | Answer indication from the terminating party |
| TC_Observe | Supervisor Console → Switch Controller | To observe a specific operator |

The Switch Controller communicates with system management 226 via NSPP/UDP/IP over the ISN Ethernet LAN 214. A system management (SM) API is used for messaging. Either a customized protocol or a simple network management protocol (SNMP), which is an industry standard messaging protocol for network management, may be used.

The switch controller 112 communicates with force management 228 via NSPP/UDP/IP over the ISN Ethernet LAN 214. A force management (FM) API that is specified by the vendor of the force management system 228 is used for messaging.

Figure 6:
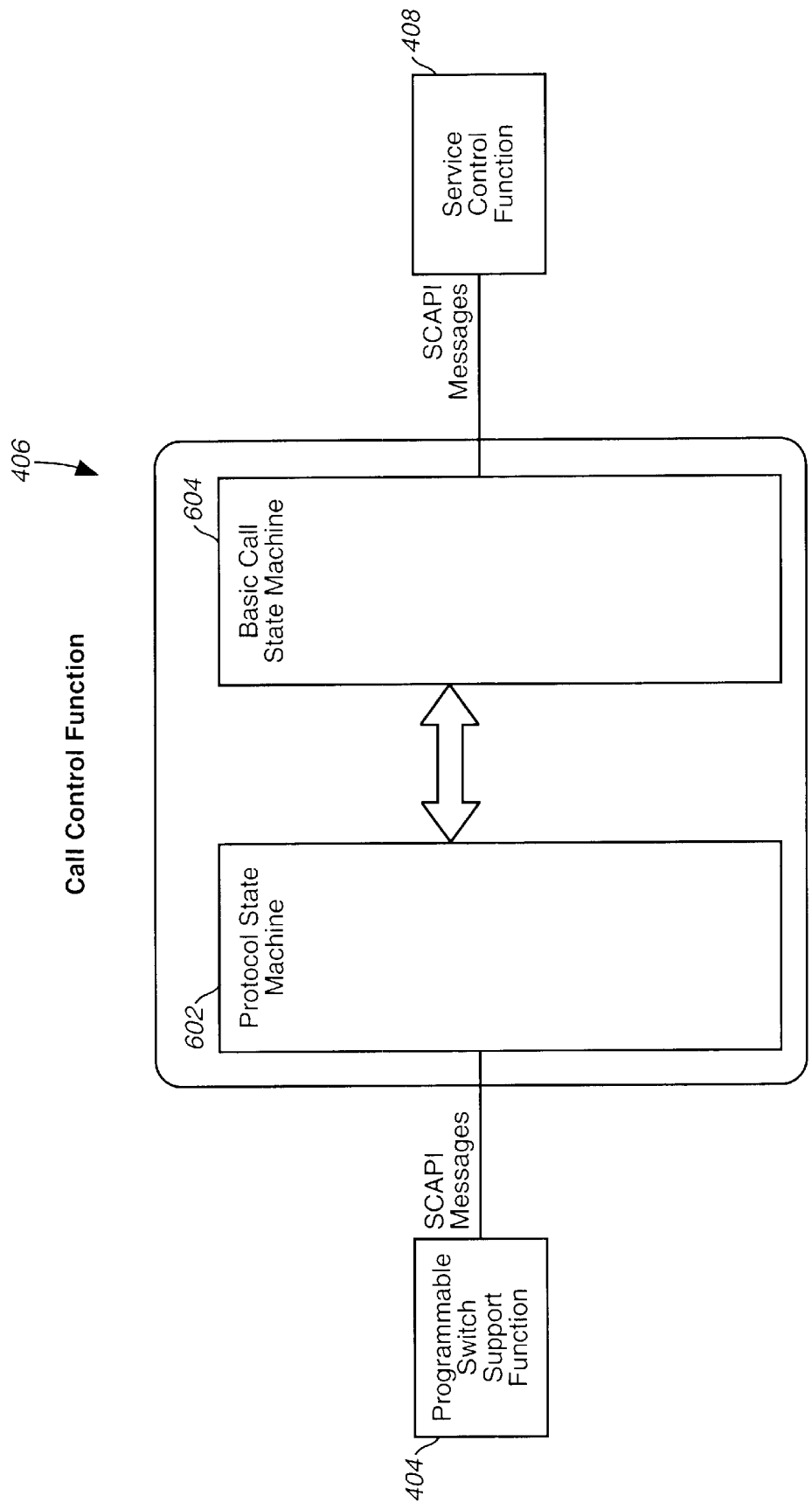
FIG. 6 is a block diagram of a call control function according to one embodiment of the present invention.

FIG. 6 illustrates a block diagram of the call control function 406. The call control function 406 comprises a call state machine 604 and a signaling protocol state machine 602. The call state machine 604 performs call processing by analyzing call processing information with respect to the current state as defined by the basic call state machine model. The call state machine 604 will be described in further detail with respect to FIG. 7. The signaling protocol state machine 602 manages the states of resources used for calls, such as programmable switch 110 ports and trunks and ISN component 116 ports. State transitions are triggered by ISUP messages received from the PSTN 106 and from TC messages received from ISN components 116.

Similar to the service logic programs which hide service-specific features, the protocol state machines 602 hide programmable switch 110 protocol state-logic. Hiding service-specific state logic and programmable switch protocol state logic enables the switch controller 112 to be a generic platform flexible to work with multiple programmable switch 110 vendors and easily modifiable to handle new services.

The protocol state machines 602 hide protocol specific details such as message details (e.g. transmit IAM) from the generic call state machine 604. The protocol state machine 602 design allows multiple programmable switch 110 signaling protocols, such as Excel API and Summa 4 signaling protocol, to be supported by the same switch controller 112. In addition, the protocol state machines 602 can accept trunks configured for different protocol variants e.g. UK ISUP, ANSI ISUP.

The call control function 406 has separate instances of the protocol state machines 602 for each resource, such as a programmable switch trunk. Because the protocol state event machines 602 are resource/trunk-specific, a call state machine 604 interacts with multiple protocol state machines 602 to control a call.

Figure 7:
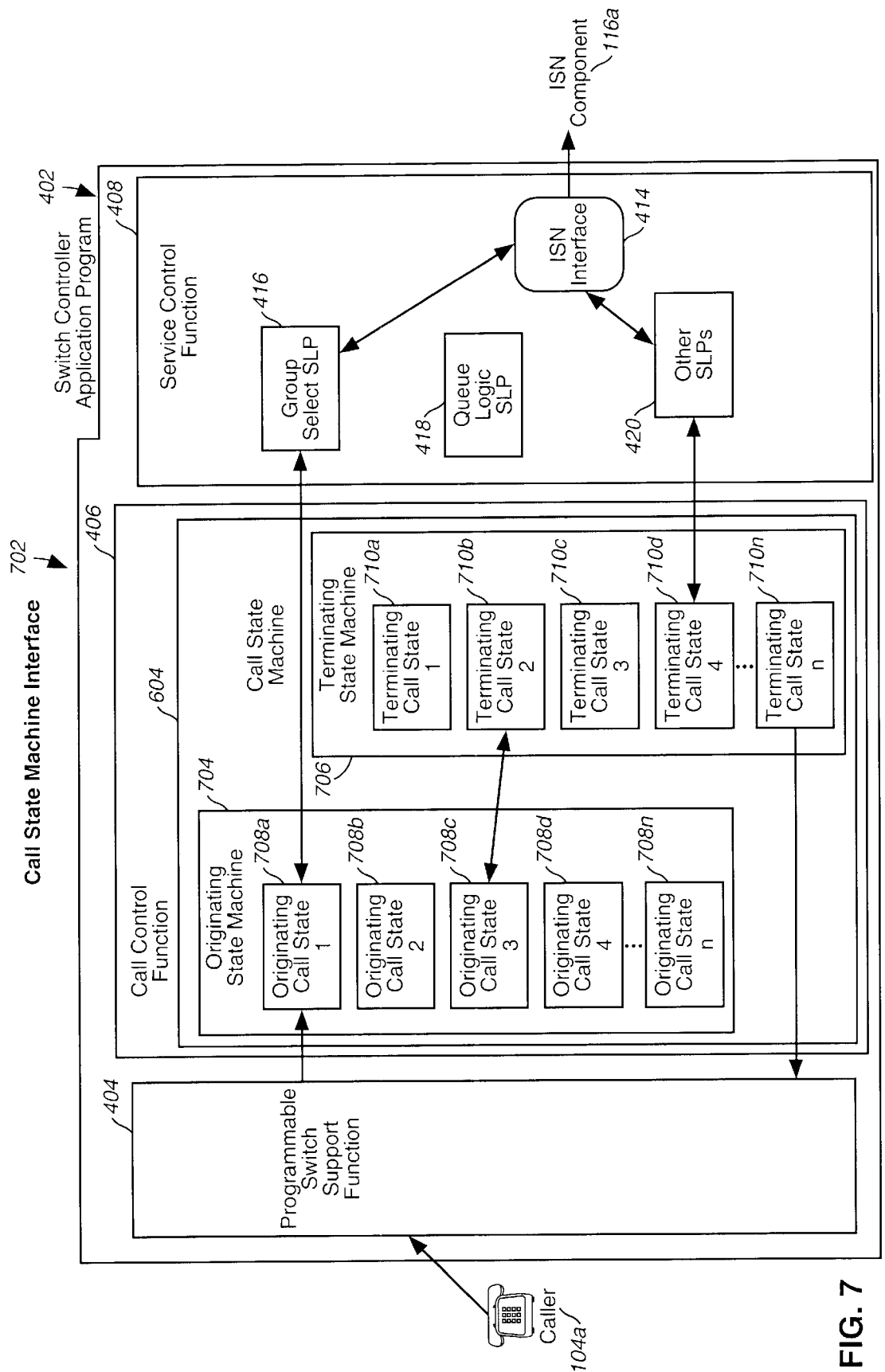
FIG. 7 is a block diagram of the call state machine interface according to one embodiment of the present invention.

FIG. 7 is a block diagram of the call state machine 604 interface. The call state machine 604 interfaces with the programmable switch support function 404 (via the protocol state machine 602 not shown in FIG. 7) and the service control function 408. The protocol state machine 602 and the service control function 408 hide all non-generic call processing functions from the call state machine 604 resulting in flexibility to handle non-generic call processing without changes to the call state machine 604 and with minimal isolated changes to other switch controller application 402 routines.

The call state machine 604 comprises two state machines for the originating and terminating legs of a call. A exemplary call is established between a calling party using calling device 104a and a receiving party using calling device 104b via an ISN 108a. The leg between the calling party using calling device 104a and ISN 108a is the originating leg. The leg between the ISN 108a and the receiving party using calling device 104b is the terminating leg. The call state machine 604 includes two separate state machines for the originating and terminating legs. The originating state machine 704 represents the state, referred to as the originating call state 708a, 708b, 708c, 708d, . . . 708n, of the originating leg of the call. The terminating state machine 706 represents the state, referred to as the terminating call state, 710a, 710b, 710c, 710d, . . . 710n, of the terminating leg of the call. A global state variable provides the state of a leg of a call. An originating global state variable tracks which of the originating call states 708 is associated with the originating leg of a call at a particular time. A terminating global state variable tracks which of the terminating call states 710 is associated with the terminating leg of a call at a particular time.

The separate originating and terminating state machine design allows for independent control of the originating and terminating legs. Functions such as splitting, merging and joining the originating and terminating legs of a call can be accommodated.) As a result, the separate originating and terminating state machine design provides a base for implementation of products requiring separate control of the originating and terminating legs such as multi-party conference and holding/waiting of calls. The separate originating and terminating state machine design also allows for the ability to perform call accounting and statistics per leg.

State changes occur because of detection point arming and processing resulting from a received event. Further description of state changes is provided with respect to FIGS. 9A–9D.

The call state machine 604 is modeled based on standard call states which are described in further detail in the International Telecommunications Union (ITU) specifications Q.1224, http://www.itu.ch/itudoc/itu-t/rec/q/q1000 up/q1218.html incorporated by reference herein. Originating call states 708 associated with the originating state machine 704 are described in further detail with respect to Table 14 below. Originating call states 708 indicating failure are described in further detail with respect to Table 15 below.

TABLE 14

Originating Call States

| Originating Call State | Description |
| --- | --- |
| O_Null | Initial state for originating call model, allocates internal resources |
| Authorize_Origination_Attempt | Determines if originating Party has the authority to set up the call, based on the attributes known so far |
| Collect_Information | Collects the routing and address digits required to complete the call |
| Analyze_Information | Analyzes and/or translates the collected digits according to the dialing plan to determine routing address and call types (e.g., a route list is returned) |
| Select_Route | Interprets routing address and call |
| Authorize_Call_Setup | It verifies the authority of the calling party to place this particular call |
| Send_Call | It sends an indication to set up a call to the specified called party ID to the terminating call model |
| O_Alerting | It waits for the terminating party to answer |
| O_Active | Connection is established between calling party and called party. It collects accounting data. Basic call cal be put on hold by service logic |
| O_Suspended | Basic call is suspended and waiting for responses from terminating call or service logic |
| O_Exception | Exception event encountered |

TABLE 15

Originating Call States Indicating Failure

| Originating Call State | Description |
| --- | --- |
| Origination Denied | The incoming call cannot be serviced in the Switch Controller. For example, the access code is not recognized |
| Collect_timeout | The Collect Timeout event is detected when enough information to process the call was not received by the Switch Controller. For example, IAM did not contain enough information to originate a call |
| Invalid Information | Invalid information received (e.g., Wrong number format) |
| Authorize Route Failure | Unable to select a route. Unable to determine a correct route, no more routes on the route list |
| Active Failure | Abnormal condition during active call (e.g., Hardware failure) |
| Suspend Failure | Failure to successfully disconnect the call |
| Route Failure | e.g., No more routes left to try |
| Route Busy | Selected route is busy |
| Calling Party Disconnect | Calling Party has been disconnected |
| Reconnect | Originating party goes offhook before the re-answer timer expires |

Terminating call states 710 associated with the terminating state machine 706 are described in further detail with respect to Table 16 below. Terminating call states 710 indicating failure are described in further detail with respect to Table 17 below.

TABLE 16

Terminating Call States

| Terminating Call State | Description |
| --- | --- |
| T_Null | Initial state of the Terminating Call Model |
| Authorize Termination | Verification of authority to route the call to the terminating access |

TABLE 16-continued

Terminating Call States

| Terminating Call State | Description |
| --- | --- |
| Attempt Select_Facility | Busy/Idle status of the terminating access is determined |
| Present Call | Terminating resource informed of the incoming call |
| T_Alerting | Terminating party alerted. Waiting for answer by terminating party |
| T_Active | The terminating party has accepted the call |
| T_Suspended | Terminating party disconnects |
| T_Exception | Exception event encountered |

TABLE 17

Terminating Call States Indicating Failure

| Terminating Call State | Description |
| --- | --- |
| Termination Denied | occurs when the authority to route the call to the terminating user is denied; not applicable for Day 1 |
| Presentation Failure | e.g. C party termination failure |
| Call Rejected | not applicable for Day 1 |
| Active Failure | abnormal events during active call (e.g., hardware failure) |
| Suspend Failure | failure to successfully disconnect the call |

Figure 8:
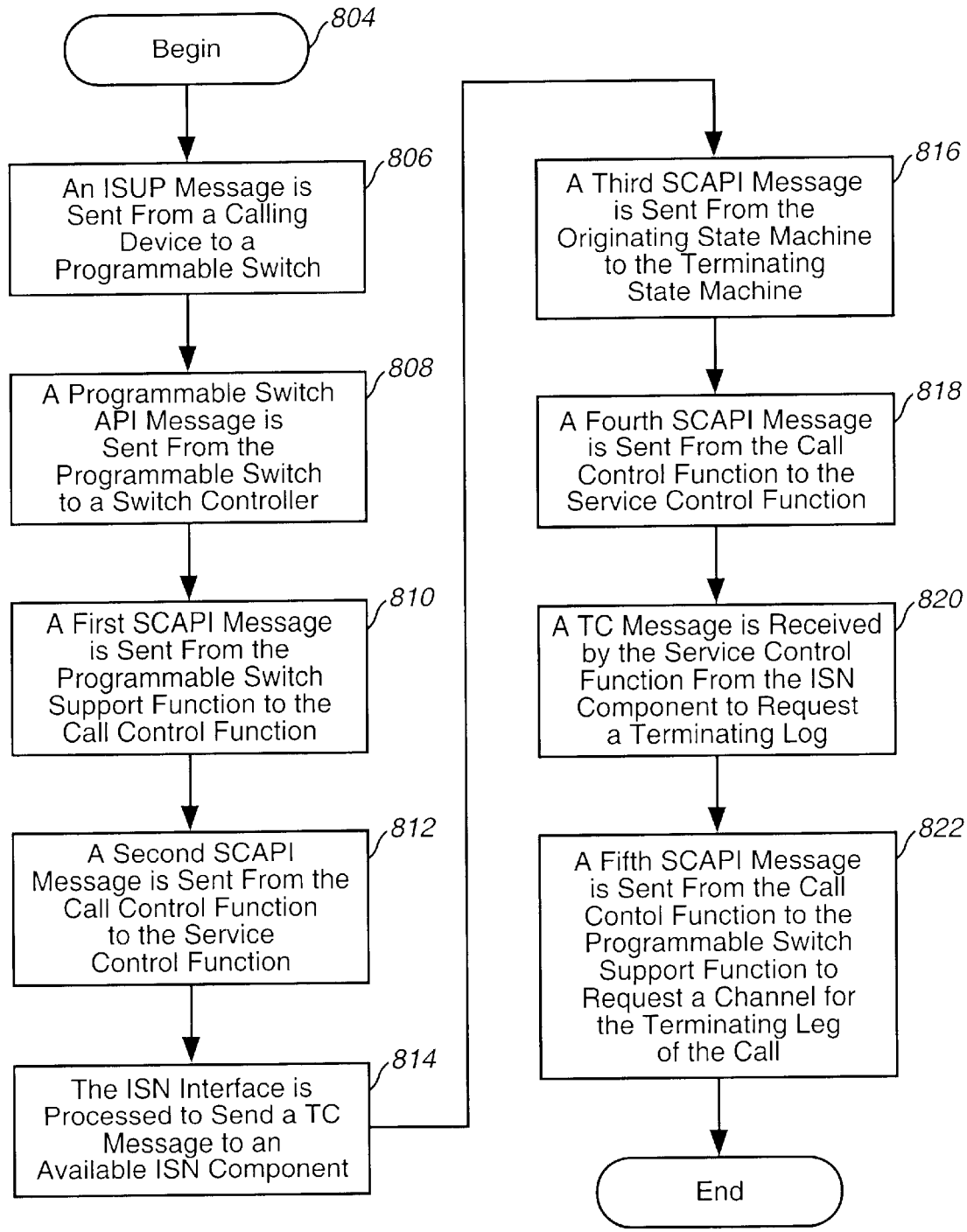
FIG. 8 is a flowchart of call state machine processing according to one embodiment of the present invention.

FIG. 8 is a flowchart of call state machine processing 802. Call state machine processing 802 is described with respect to establishing an exemplary call between a calling party using calling device 104*a* and a receiving party using calling device 104*b* via ISN 108*a*. In order to establish the exemplary call, both an originating leg between calling device 104*a* and ISN 108*a* and a terminating leg between ISN 108*a* and calling device 104*b* must be established. In the exemplary call, an ISN component is immediately available and the call does not need to be queued. Call state machine processing 802 will be described with respect to relationships drawn between the switch controller application program 402 functions and call states shown in FIG. 7.

In 806, an ISUP message is sent from calling device 104*a* to the programmable switch 110*a*. The ISUP messages used to establish a call are described in further detail in Table 12 above.

In 808, a programmable switch API message is sent from the programmable switch 110*a* to switch controller 112*a*. The programmable switch API message is received by the programmable switch support function 404. The programmable switch API message varies based on the programmable switch vendor as discussed with respect to FIG. 5. The protocol state machine 602 manages the programmable switch 110 specific details of call processing as discussed with respect to FIG. 6.

In 810, a first SCAPI message is sent from the programmable switch support function 404 to the call control function 406. The receipt of the first SCAPI message is an event that is processed by the call control function 406. The receipt of the first SCAPI message causes the originating global state variable to be set to originating call state 1 708*a*.

In 812, a second SCAPI message is sent from the call control function 406 to the service control function 408 as the result of processing associated with originating call state 1 708*a*. The second SCAPI message causes processing of the group select service logic program 416 to identify groups of ports connected to ISN components 116 of the type capable of processing the incoming call. A response to the second SCAPI message is received indicating that ISN component 116a is available to process the call. The response causes the originating global state variable to reflect that originating call state 3 708c is the state of the originating leg of the call.

In 814, the ISN interface 414 is processed to send a TC message to an ISN component 116a that is available to process the incoming call. Processing of the call queue service logic program 418 is not needed because in the exemplary call, ISN component 116a was available immediately.

In 816, a third SCAPI message is sent from the originating state machine 704 to the terminating state machine 706 to indicate that a terminating leg will be needed for an incoming call.

The third SCAPI message is the result of processing associated with originating call state 3 708c. The terminating global state variable reflects that terminating call state 2 710b is the state of the terminating leg of the call.

In 818, a fourth SCAPI message is sent from the call control function 406 to other service logic programs 410. The fourth SCAPI message is the result of processing associated with terminating call state 2 710b. The fourth SCAPI message inquires as to whether a TC message was received from ISN component 116a to establish a terminating leg for the call.

In 820, a TC message is received from ISN component 116a by the service control function 408 requesting a terminating leg for the call. The TC message is processed by the ISN interface 414. One or more of the other service logic programs 420 inquire the ISN interface 414 and determine that a TC message was received requesting a terminating leg for the call. The other service logic programs 420 that inquired respond to the fourth SCAPI message indicating that a TC message was received requesting a terminating leg for the call. The response to the fourth SCAPI message causes the terminating global state variable to reflect that terminating call state n 710n is the state of the terminating leg of the call.

In 822, a fifth SCAPI message is sent from the call control function 406 to the programmable switch support function 404 to request a channel for the terminating leg of the call. The fifth SCAPI message results from processing associated with terminating call state n 710n.

Figure 9A:
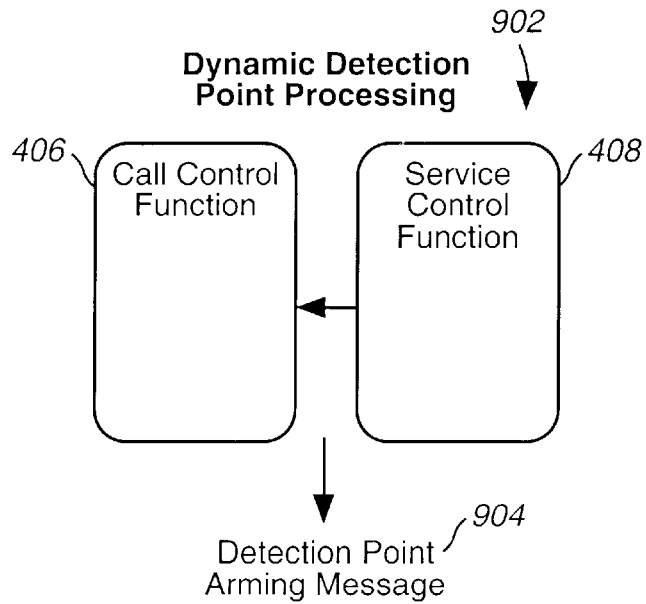
FIG. 9A is a block diagram of dynamic detection point processing according to one embodiment of the present invention.
Figure 9B:
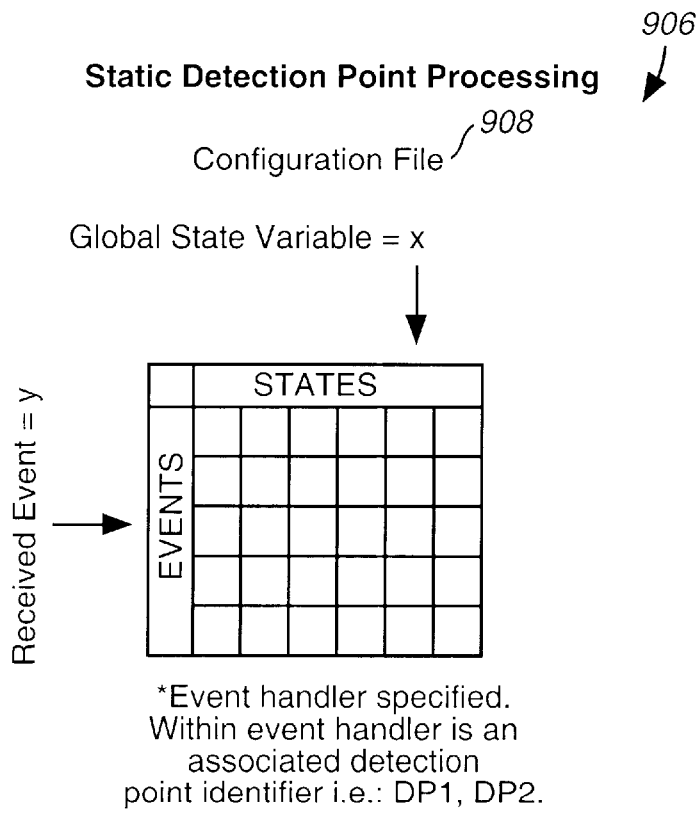
FIG. 9B is a block diagram of detection point processing based on state according to one embodiment of the present invention.

FIGS. 9A and 9B illustrate two types of processing that cause call state changes. Call state changes may be based on dynamic detection point processing 902 or static detection point processing 906. A detection point is a point in the processing of a call state at which the modifying features of the processing performed as a result of the call state are informed of an event the call control function 406 is about to process. The modifying features are features within the lines of code processed as a result of a call state that cause a state change.

A modifying feature may respond to notification of an event the call control function 406 is about to process with one of three actions: (1) trigger itself which will cause the call control function 406 to perform processing based on the event and the current state, (2) allow extension of call processing to a service logic program, or (3) override processing as a result of the incoming event, preempting processing that would be performed as a result of the incoming event and performing processing not associated with the incoming event. Therefore, processing is based on a current state of a call and an incoming event received unless the processing associated with an incoming event is preempted. An example of preempting processing of an incoming event is preempting call processing to reestablish a failed connection with a programmable switch 110a.

A modifying feature triggers itself causing the call control function 406 to perform processing when the detection point is armed. A detection point is armed when a pointer or other notification means in software indicates that processing is to be performed. A detection point may be armed dynamically as shown in FIG. 9A or detection point processing may be based on static arming of the detection point as shown in FIG. 9B.

FIG. 9A illustrates dynamic detection point processing 902. Dynamic detection point processing 902 occurs as the result of a detection point arming message 904 sent from a service logic program within the service control function 408 to the call control function 406. The detection point arming message 904 informs the call control function 406 to arm a detection point during call set-up. The detection point arming message 904 provides a detection point identifier that can be analyzed using data stored in memory pointed to by a pointer associated with the detection point identifier.

Dynamic detection point processing 902 allows a detection point to be armed for only the particular call being processed. After call set-up is complete for the call, the detection point is no longer armed unless another detection point arming message 904 is sent. Dynamic detection point processing 902 allows service logic programs to cause the call control function 406 to perform functions for particular calls as directed by the service logic program.

FIG. 9B illustrates static detection point processing 906. Static detection point processing 906 is performed using configuration file 908. Configuration file 908 is system wide. Detection points armed in the configuration file 908 are armed for all calls processed by the call control function 406. The configuration file 908 stores arming information based on possible received events and current call states as indicated by a global state variable. When an event is received, an event handler is processed which handles initial processing needed to identify event and initiate further processing. The event handler includes an associated detection point identifier which identifies the current detection point and can be used to determine whether a detection point is armed.

While various embodiments of the present invention have been described above, it should be understood that they have been presented by way of example only, not limitation. Thus the breadth and scope of the present invention should not be limited by any of the above-described exemplary embodiments, but should be defined only in accordance with the following claims and their equivalents.

What is claimed is:

1. A switch controller, comprising:
   a programmable switch support providing an interface to a programmable switch;
   a call control establishing a connection between two ports on said programmable switch;
   a service control interfacing with an intelligent service network component;
   a resource control monitoring the state of a call and service related resources; and
   a management interface providing an interface to external management systems wherein the switch controller provides external commands to the programmable switch to control call processing.

2. The switch controller of claim 1, wherein said call control comprises:

one or more protocol state machines; and a call state machine.

3. The switch controller of claim 1, wherein said call control comprises:

an originating state machine, wherein said originating state machine tracks an originating state of one or more possible originating states for an originating leg of a call; and a terminating state machine, wherein said terminating state machine tracks a terminating state of one or more possible terminating states for a terminating leg of a call.

4. The switch controller of claim 1, wherein said service control comprises:

a switch service process; and one or more service logic programs.

5. The switch controller of claim 4, wherein one of said one or more service logic programs is one of:

a group select module;

a call queuing module;

an operator service logic module;

a network service logic module;

a prepaid service logic program; or an automatic trunk routing service logic program.

6. The switch controller of claim 1, wherein said resource control comprises:

a resource management process; and a system control process.

7. The switch controller of claim 1, wherein said management interface comprises:

a process manager.

8. The switch controller of claim 7, wherein said management interface further comprises one of:

a system management interface;

a force management interface; or a switch configuration utility.

9. A method for processing a call by a switch controller, comprising:

processing a switch controller application programmer interface message by a call control function within a switch controller application program, wherein said call control function comprises a call state machine, wherein the call has a call state which is one of a plurality of possible call states of said call state machine; and modifying a value of a global state variable associated with said call state to identify groups of ports enabling processing of the call, wherein the switch controller interfaces with an intelligent service network component.

10. The method of claim 9, wherein processing further comprises:

(i) identifying an event associated with receipt of said switch controller application programmer interface message;

(ii) identifying a detection point associated with said event and said state of the call; and (iii) determining whether said detection point is armed.

11. The method of claim 10, wherein processing further comprises the of:

(iv) performing processing by said call control function if said detection point is armed.

12. The method of claim 10, further comprising the following to be performed before processing:

receiving a programmable switch application programmer interface message by a programmable switch support function within said switch controller application program; and sending said switch controller application programmer interface message from said programmable switch support function to said call control function.

* * * * *